Dec. 31, 1957  R. K. BOYER  2,818,101
VALVE STEM FOR TUBELESS TIRES
Filed Aug. 20, 1954

INVENTOR.
RALPH K. BOYER
BY Hudson, Boughton,
Williams, David & Hoffman
ATTORNEYS United States Patent Office 2,818,101
Patented Dec. 31, 1957

2,818,101

VALVE STEM FOR TUBELESS TIRES

Ralph K. Boyer, Cleveland, Ohio, assignor to The Dill Manufacturing Company, Cleveland, Ohio, a corporation of Ohio Application August 20, 1954, Serial No. 451,121

5 Claims. (Cl. 152—427)

This invention relates to a valve stem which is particularly adapted and intended for use in connection with the rim upon which is mounted a tubeless tire.

Valve stems used in connection with tubeless tires are mounted upon the rim and extend through the valve stem opening which is associated with or formed in every rim. Such valve stem openings have become standardized as to their size.

Valve stems which are to be so used must obviously be capable of being securely mounted upon the rim and moreover the attachment of the valve stem with respect to the rim must be airtight and remain airtight when the tire is inflated and in service.

In the present instance the valve stem is principally constructed of rubber or equivalent material and is of the type which are known as snap rubber valve stems in that they are mounted upon a rim, and are so constructed that they may be pulled and stretched at least in part, through the valve stem opening and snapped into place, with the rubber becoming in part confined in the valve stem opening in the rim and in part packed around the surface of the rim in the immediate vicinity of the valve stem opening and thereby effect the required firm attachment as well as establishing an airtight fit.

Since valves of this kind depend upon the firm resilient engagement between the rubber stem and the periphery of the valve stem opening in the rim, it is necessary that the valves be so constructed that they will be able to withstand the ordinary hazards of use, particularly where the vehicle upon which the tire is mounted is used upon a terrain where rocks or other bodies of similar character may forcefully impact against the rubber stem either directly on top of the stem or by a glancing blow and the stem requires such a degree of stability that it will not be knocked out from its position with respect to the rim upon which it is mounted.

Where such snap valve stems are manufactured of rubber or an equivalent substance as they usually are, it is necessary to provide as an inherent quality of the valve stem that even though the rubber may age and tend to assume a permanent set, such condition will not result in the valve stem body becoming loosened in its attachment to the rim mounting the tubeless tire, or leak air.

As will appear upon a more detailed description of the valve stem of the present invention, the matter of deterioration or permanent set of the rubber composing the body of the stem is overcome, or at least compensated for by what may be called building into the rubber of the stem an extra amount of stress, when the stem is pulled into position in the valve stem opening of a rim, which will overcome any deficiency due to aging of the rubber.

Referring to the drawings which form a part of this specification;

Figure 1:
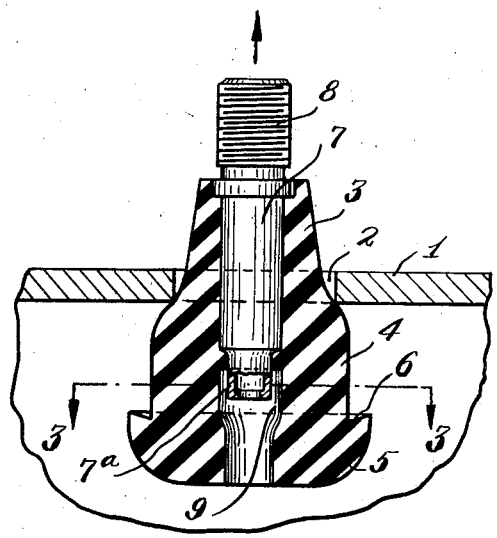
Fig. 1 shows an elevation with portions in section of a rubber valve stem of the present invention which is positioned for movement to final attachment to a rim of a tubeless tire.
Figure 3:
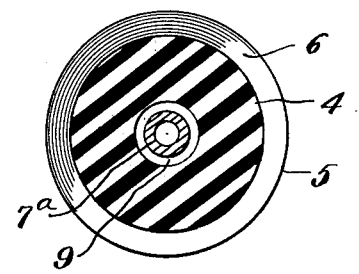
Fig. 3 is a section upon the line 3—3 of Fig. 1.

Referring to the drawings, 1 indicates in section a portion of a rim for the mounting of a tubeless tire, which is provided with the valve stem opening 2.

The rubber valve stem comprises a rubber body which at its upper end is tapered or somewhat conical, as indicated at 3. The lower portion of this conical part merges into a cylindrical portion 4 and at the end of the cylindrical portion 4 is a button-shaped head portion 5 providing a radially extending flange 6. Extending through the major portion of the rubber body is a hollow insert 7 which is metal and upon its interior is provided with means for receiving a valve insides or valve core, as it is sometimes called, such valve insides and the interior construction of the insert for receiving such a valve insides, are well-known and practiced in the art. The outer end of the insert is provided with threads designated at 8 to receive a valve cap of usual and well-known construction.

This insert is mounted in the body of rubber at the time that the rubber body is molded and the insert is so related to the rubber surrounding it that there is positive adhesion so that in effect the insert is an integral part with the rubber of the combined stem.

It is to be noted that the insert 7 does not extend throughout the length of the rubber body and that the lower end of the insert is free of attachment with respect to the said body.

The rubber body is provided with a reentrant chamber portion which is indicated at 9; the diameter of this chamber at its inner end being slightly greater than the diameter of the lower end of the insert, as indicated at 7ª.

It will appear that the lower end of the insert is not attached to the rubber body but the lower end of the insert may have at least a limited amount of movement with respect to the adjacent wall portion of the reentrant chamber 9. This is an important feature which will be pointed out later in the specification.

It should be pointed out that the rubber body of the stem at the upper or tapered portion is of lesser diameter than the diameter of the valve stem opening in the rim, the diameter of the cylindrical portion 4 is of greater diameter than the diameter of the valve stem opening in the rim and the diameter of the portion 5 which may be denominated as the head portion, is of greater diameter than the portion 4 of the stem.

When such a valve stem as has been described is to be mounted, the initial position of the valve stem is illustrated in Fig. 1 of the drawing; that is to say, the tapered portion is projected through the valve stem opening from the flanged side of the rim and a pulling force is applied to the valve body to pull the rubber body into the valve stem opening of the rim. Such an action results in the stretching and elongation of the rubber body and when sufficient force is applied the cylindrical portion 4 is compressed under internal stress to pass into the opening 2 in the rim 1.

The provision of the chamber portion 9 which extends throughout the depth of the head 5 and into the interior portion of the cylindrical body portion 4, together with the fact that no part of the insert 7 is attached to that part of the rubber body in the vicinity of the chamber 9, facilitates and, to a degree, makes possible the stretching of the rubber body, and particularly the lower portion of the cylindrical part 4 so that said cylindrical part 4 is rendered more compressible than would otherwise be the case. This in turn facilitates the forcing of the cylindrical portion 4 through the rim opening 2 when force is applied, in inserting the valve stem into the opening 2 of the rim, as has before been described.

Such force applied does not affect the head 5, but eventually as the force is continued and the part 4 compressed, the head 5 with its flange 6 will be brought into contact with the surface of the rim adjacent the opening 2 and upon release of the force pulling upon the valve body, the rubber of the cylindrical portion 4 will contract longitudinally and tend to expand radially because of the release of the force, but obviously the portion which is confined within the periphery of the opening in the rim 1 will be highly compressed and confined therein.

Figure 2:
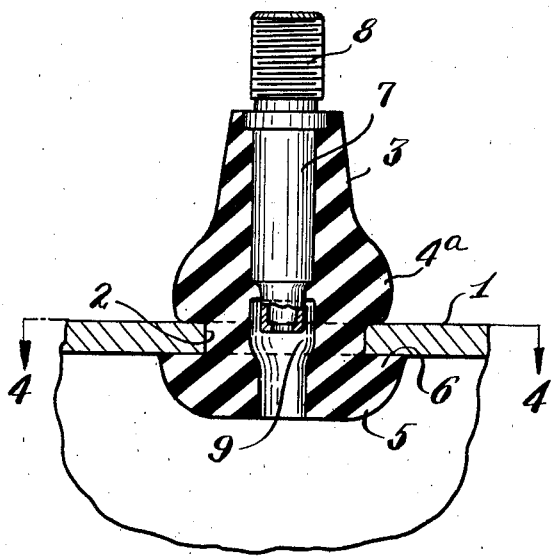
Fig. 2 is a sectional elevation showing the rubber valve stem after it has been pulled into final position, with respect to the valve stem opening in the rim and illustrates the final distribution of the rubber for the body of the valve stem with respect to the rim.
Figure 4:
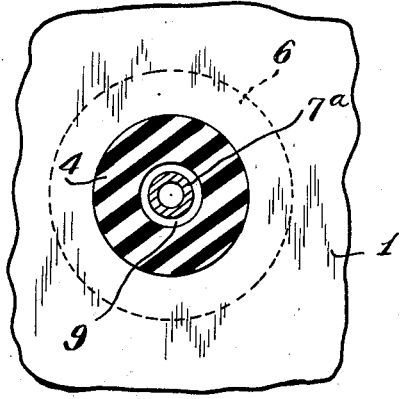
Fig. 4 is a section upon the line 4—4 of Fig. 2.

The part of the cylindrical portion 4 which, when in the position illustrated in Fig. 2, is above the rim, will tend to return to its initial condition and in so doing a portion of it will spread out upon the rim surface adjacent the hole 2 and so effect a binding action with respect to the rubber body and the rim. The fact that this portion 4 becomes bulged out as indicated at 4a in Fig. 2, means that the rubber is under stress even in the final position of the valve stem with respect to the opening in the rim and the built-in stress, incident to the deformation of the cylindrical portion of the valve stem when it assumes the position shown in Fig. 2 of the drawing, will compensate for any aging and deterioration of the rubber of the stem as the tubeless tire is used. At least it will overcome any deficiency which might be the result of the aging of the rubber.

All valve stems when used upon rims mounting tires are subject to hazards of use by being impacted by foreign objects such as rocks or things of that character sometimes in a direction of the vertical axis of the stem and sometimes by a side blow.

In a valve stem structure such as herein disclosed, and where there is no mechanical clamping affecting the attachment of the valve stem to the rim, it is necessary that other provision be made to take care of the situation which has been mentioned above.

In the present construction the desired results are obtained by providing that the insert 7, at its lower end, be unattached to the rubber body and providing the lower end of the insert may extend into a chambered portion which at least is of greater diameter than the diameter of the lower end of the insert. Under these conditions, if a blow be struck upon the top of the valve stem or more particularly upon the top of the insert, in a substantially vertical direction, due to the fact that the lower end of the insert does not extend to the end of the rubber body and is unattached to the said body, any such blow will simply tend to compress the portion of the rubber body at the expanded portion 4a and will not tend to push the rubber through the opening 2. Such would not be the case if the insert extended entirely through the rubber body and was secured thereto throughout its length.

Where a glancing blow or impact is struck against the stem so that it tends to become deflected from its erect position, the stress is taken by the body of rubber forming the portion 4 which is above the rim. This is brought about by several facts: the first of which is that the lower end of the insert does not extend entirely through the rubber body of the stem; secondly, that the lower end of the insert has a limited amount of movement relative to the cylindrical rubber body and in the third place, the bottom end of the insert is essentially not below a transverse plane which includes the surface of the rim.

It will be apparent that changes may be made in the constructive features, involving the same features of operation as are herein disclosed, and coming within the terms of the claims, without departing from the spirit of the invention.

Having thus described my invention, I claim:

1. A valve stem adapted to be mounted in the valve stem opening of a tubeless tire rim, said valve stem comprising a stem body formed of elastic rubber material and having an outer end portion merging with a cylindrical portion provided with an enlarged head on the free end thereof, said outer end portion from its outer free end inwardly for the major part of its length being of a diameter to pass freely through said rim opening while said cylindrical portion is of a greater diameter than said rim opening, a central bore extending longitudinally through said stem body, the material of said cylindrical portion being uniform and uninterrupted from said bore to the circumference of said cylindrical portion throughout the length thereof, a rigid insert adapted to receive a valve core and mounted in said bore and of a length to extend completely through said outer end portion and partially into said cylindrical portion, said insert being secured to the inner wall of the outer end portion throughout the length thereof and to the inner wall of the cylindrical portion for a part of its length adjacent to said outer end portion while the remaining part of the length of said cylindrical portion is free from said insert and retains its full elasticity and is longitudinally stretchable, whereby when said outer end portion of the stem body is positioned in the valve stem opening of a tubeless tire rim and force is applied to said insert longitudinally thereof to engage the cylindrical portion with said rim said cylindrical portion is stretched or attenuated longitudinally and its diameter is reduced sufficiently to enable it to pass through the rim opening until said head engages one side of said rim, and, upon termination of the application of said force, the cylindrical portion contracts longitudinally and tends to resume its normal diameter, with the result that said cylindrical portion expands radially into tight air sealing and stem retaining pressure contact with the periphery of the rim opening and also beyond said opening expands radially into a bulbous configuration which engages the side of said rim opposite from the side engaged by said head and provides a reservoir of elastic rubber material to maintain the air sealing and stem retaining contact of the cylindrical portion with the periphery of the rim opening notwithstanding any tendency of the elastic rubber material to set or age.

2. A valve stem as defined in claim 1 and wherein said rigid insert is of a length such that when the valve stem is operatively mounted in the rim opening with said head engaging said rim the end of said insert within said cylindrical portion is located adjacent to the side of the rim engaged by said bulbous configuration and spaced from the side of the rim engaged by said head.

3. A valve stem as defined in claim 1 and wherein said rigid insert within said cylindrical portion has an end part of reduced diameter which is spaced radially inwardly from the wall of the bore extending through said stem body.

4. A valve stem as defined in claim 1 and wherein said outer end portion of said stem body flares radially outwardly to said cylindrical portion and merges directly therewith.

5. A valve stem as defined in claim 1 and wherein said outer end portion is of tapered configuration and has its large end merging directly with the said cylindrical portion.

References Cited in the file of this patent

UNITED STATES PATENTS

| | | |
|---|---|---|
| 1,831,000 | Hawkinson | Nov. 10, 1931 |
| 2,272,886 | Wilson | Feb. 10, 1942 |
| 2,634,785 | Tubbs | April 14, 1953 |

FOREIGN PATENTS

| | | |
|---|---|---|
| 443,557 | Great Britain | Mar. 2, 1936 |